United States Patent
Kim

(10) Patent No.: US 7,637,128 B2
(45) Date of Patent: Dec. 29, 2009

(54) OIL DAMPER FOR DRUM-TYPE WASHING MACHINE

(75) Inventor: Jong Seog Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 513 days.

(21) Appl. No.: 10/552,958

(22) PCT Filed: Mar. 16, 2005

(86) PCT No.: PCT/KR2005/000759

§ 371 (c)(1),
(2), (4) Date: Nov. 14, 2006

(87) PCT Pub. No.: WO2006/004252

PCT Pub. Date: Jan. 12, 2006

(65) Prior Publication Data

US 2009/0064724 A1  Mar. 12, 2009

(30) Foreign Application Priority Data

Mar. 17, 2004  (KR) .............................. P 2004-17896

(51) Int. Cl.
*D06F 37/22*  (2006.01)
(52) U.S. Cl. ................ 68/23.1; 188/266.1; 188/322.17; 188/322.18; 188/322.22
(58) Field of Classification Search ................ 68/12.06, 68/23.1, 23.3; 188/266.1, 266.2, 322.15, 188/322.16, 322.17, 322.22, 322.18
See application file for complete search history.

(56) References Cited

U.S. PATENT DOCUMENTS

| | | | |
|---|---|---|---|
| 2,642,996 A | | 6/1953 | Oeler et al. |
| 3,424,448 A | * | 1/1969 | Ma .............................. 267/35 |
| 4,466,514 A | | 8/1984 | Mölders et al. |
| 4,765,444 A | * | 8/1988 | Bauer et al. .................. 188/129 |
| 4,934,493 A | * | 6/1990 | Bauer et al. .................. 188/381 |
| 4,991,412 A | * | 2/1991 | Bauer et al. .................. 68/23.1 |
| 5,080,204 A | * | 1/1992 | Bauer et al. .................. 188/129 |
| 5,207,081 A | * | 5/1993 | Fuse .......................... 68/23.1 |
| 5,277,281 A | * | 1/1994 | Carlson et al. .............. 188/267 |
| 5,531,299 A | * | 7/1996 | Bataille ................. 188/322.17 |
| 6,135,434 A | * | 10/2000 | Marking ................... 267/64.26 |
| 6,311,962 B1 | * | 11/2001 | Marking ................... 267/64.25 |
| 6,325,187 B1 | * | 12/2001 | Boucher ................ 188/322.17 |

(Continued)

FOREIGN PATENT DOCUMENTS

DE  3604286  10/1986

*Primary Examiner*—Joseph L Perrin
(74) *Attorney, Agent, or Firm*—McKenna Long & Aldridge LLP

(57) ABSTRACT

Oil damper for a drum type washing machine including a hollow cylinder having an oil chamber for filling oil therein, a tub holder fixedly secured to one end of the cylinder for securing the damper to a tub side, a shaft passed through, and exposed from the other end of the cylinder, a base holder fixedly secured to the shaft at an end thereof exposed to an outside of the cylinder for securing the damper to a base side of the cabinet, and a piston having a plurality of oil holes, for sliding inside of the cylinder, wherein at least one of above components is formed by plastic injection molding, thereby providing a new oil damper which reduces a production cost significantly, and has a good productivity, and high operation reliability.

27 Claims, 5 Drawing Sheets

U.S. PATENT DOCUMENTS

| | | | |
|---|---|---|---|
| 6,581,918 B2 * | 6/2003 | Voelkel | 267/64.27 |
| 6,607,186 B2 * | 8/2003 | Voelkel | 267/64.27 |
| 6,691,842 B1 * | 2/2004 | Lai | 188/282.7 |
| 2004/0016266 A1 | 1/2004 | Hisano | |
| 2005/0051397 A1 * | 3/2005 | Goscinski | 188/299.1 |

* cited by examiner

OIL DAMPER FOR DRUM-TYPE WASHING MACHINE

TECHNICAL FIELD

The present invention relates to dampers in drum type washing machines, more particularly, to an oil damper applied to a drum type washing machine.

BACKGROUND ART

In general, the washing machine is a home appliance for removing dirt from laundry by using chemical decomposition and mechanical impact.

There are drum type and pulsator type in the washing machines. It is recent trend that demand for the drum type washing machines increases gradually because the drum type washing machine enables to reduce an overall height of the washing machine, increase washing capacity, reduce washing water, and cause almost no problem of laundry entangle, and the like, compared to the pulsator type washing machine in which a drum rotates in an upstanding position.

A related art drum type washing machine will be described with reference to the attached drawings.

FIG. 1 illustrates a section of a related art drum type washing machine, provided with a cabinet 10 forming an exterior, a tub 20 in the cabinet 10, a damper 100 and suspension springs 50 for supporting the tub, a substantially cylindrical drum 30 rotatably mounted in the tub 20, and a driving unit 40 serving as a driving source for driving the drum 30.

In general, the driving unit 40 is provided with a stator mounted to a rear wall of the tub, and a rotor mounted on an outside of the stator and directly coupled to the drum with a shaft for rotating when power is applied to the stator, of which detailed description will be omitted.

The suspension springs 50 are mounted between an upper surface of the cabinet 10 and an upper portion of the tub 20, and the damper 100 is mounted between a base of the cabinet 10 and the lower portion of the tub 20, for damping vibration of the tub 20 occurred at the time of spinning.

The operation of the related art drum type washing machine will be described.

When the user intends to wash laundry, upon pushing a washing start button after putting in the laundry in the drum 30 in a state power is applied thereto, washing water is supplied to the drum 30.

Upon finishing water supply, the drum 30 rotates by driving force of the driving unit 40 in a state the laundry is submerged in the washing water.

As the drum 30 rotates, the laundry and water in the drum 30 are lifted upward to a predetermined height following an inside surface of the drum 30, and fall down, to cause impact and friction coming from a head to the laundry as above steps are repeated, such that the washing is made by the impact and friction and decomposition by detergent.

Upon finishing the washing, a spinning step is started after passing through a rinsing step according to a number of times set at a microcomputer. In the spinning step, the drum 30 rotates at a high speed, for extracting water.

The drum type washing machine in FIG. 1 illustrates one without a drying function. There is a drum type washing machine which can drying after spinning.

In the meantime, as dampers for damping vibration of the tub 20 during washing and spinning of the drum type washing machine, there are a friction damper for performing damping by friction force, and an oil damper utilizing fluidity of oil. Though the oil damper is favorable in view of damping characteristics, since the friction damper is favorable in view of price, the friction damper is used widely.

That is, because the price of the oil damper is higher than the friction damper by more than five times, the manufacturer is required to take a burden of excessively high production cost of the drum type washing machine if the oil damper is used.

FIG. 2 illustrates a perspective view of an exterior of a related art oil damper D'.

Referring to FIG. 2, the related art oil damper D' is provided with a metal cylinder 1a with metal caps 60 welded to opposite ends respectively, oil filled in the cylinder 1a, a shaft 70 exposed through one end thereof, and a metal piston (not shown) coupled to the other end wherefrom the shaft 70 is not exposed to an outside of the metal cylinder 1a, so that the piston slides inside of the metal cylinder.

Accordingly, the related art oil damper D' has many disadvantages in application to a product, due to high the production cost, and low productivity coming from requirement for a welding step because the related art oil damper D' is constructed of metal entirely, and a high sliding resistance of the piston during operation of the oil damper D' which causes a problem of reliability in operation.

DISCLOSURE

Technical Problem

An object of the present invention is to provide an oil damper for a drum type washing machine, in which a structure of an oil damper applicable to the drum type washing machine is improved, by changing materials of main components thereof to a plastic that enables injection molding, for reducing production cost significantly through mass production, and improving productivity and reliability.

Technical Solution

The object of the present invention can be achieved by providing an oil damper for a drum type washing machine including a hollow cylinder having an oil chamber for filling oil therein, a tub holder fixedly secured to one end of the cylinder for securing the damper to a tub side, a shaft passed through, and exposed from the other end of the cylinder, a base holder fixedly secured to the shaft at an end thereof exposed to an outside of the cylinder for securing the damper to a base side of the cabinet, and a piston having a plurality of oil holes, for sliding inside of the cylinder, wherein at least one of above components is formed by plastic injection molding.

In another aspect of the present invention, a oil damper includes a hollow cylinder having an oil chamber for filling oil therein, a tub holder fixedly secured to one end of the cylinder for securing the damper to a tub side, a metal shaft passed through, and exposed from the other end of the cylinder, a base holder fixedly secured to the shaft at an end thereof exposed to an outside of the cylinder for securing the damper to a base side of the cabinet, and a piston having a plurality of oil holes, for sliding inside of the cylinder, wherein at least one of above components except the shaft is formed by plastic injection molding.

Advantageous Effects

The present invention suggests improving a structure of an oil damper.

According to this, materials of major components of the oil damper are changed to plastic, to reduce a production cost of the oil damper, significantly.

Along with this, the oil damper of the present invention enables mass production to improve productivity, and to provide highly reliable oil dampers by improvement of reliability of the components, that in turn enhances reliability of the drum type washing machine having the oil damper applied thereto.

BEST MODE

Preferred embodiments of the oil damper for a drum type washing machine of the present invention will be described with reference to the attached drawings.

In order to describe a mounting state of the oil damper of the present invention and portions related thereto, the related art drum type washing machine may be cited.

Figure 1:
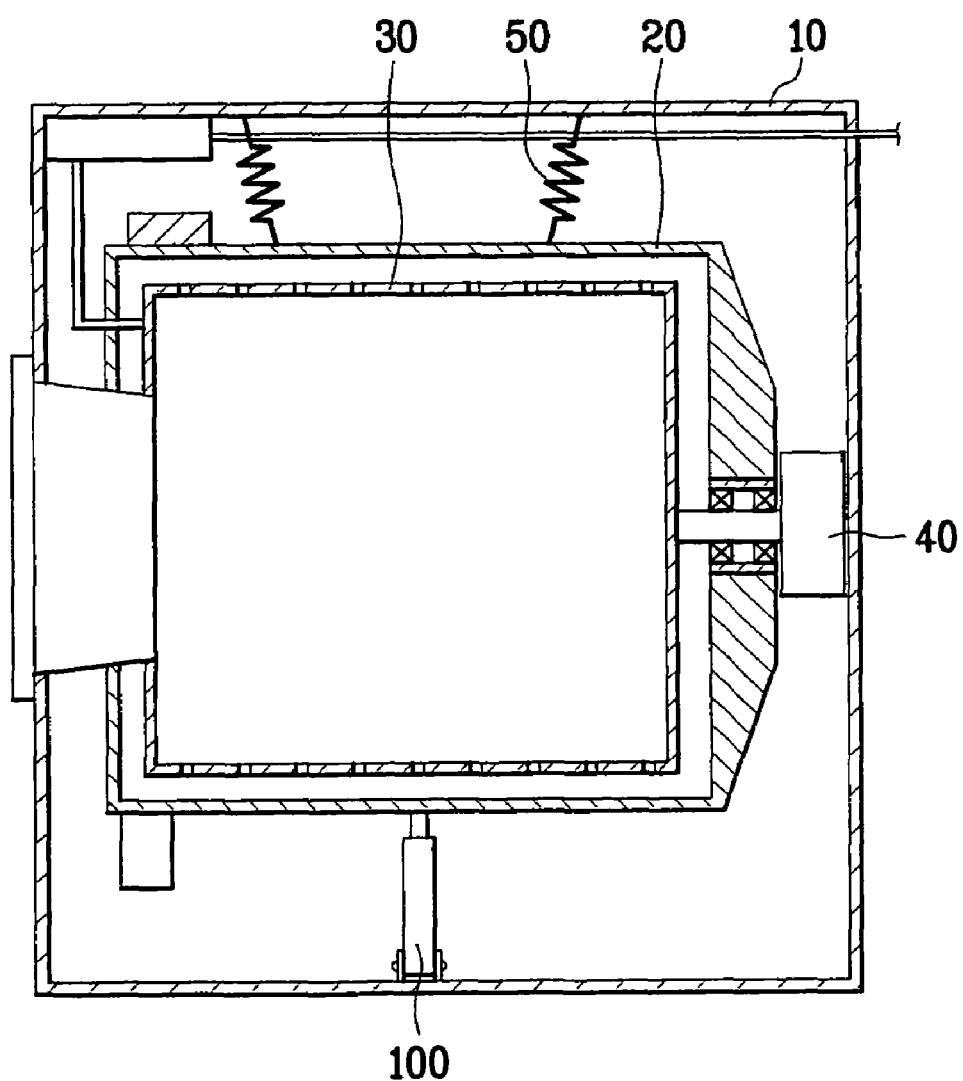
FIG. 1 illustrates a section of a related art drum type washing machine, schematically.
Figure 2:
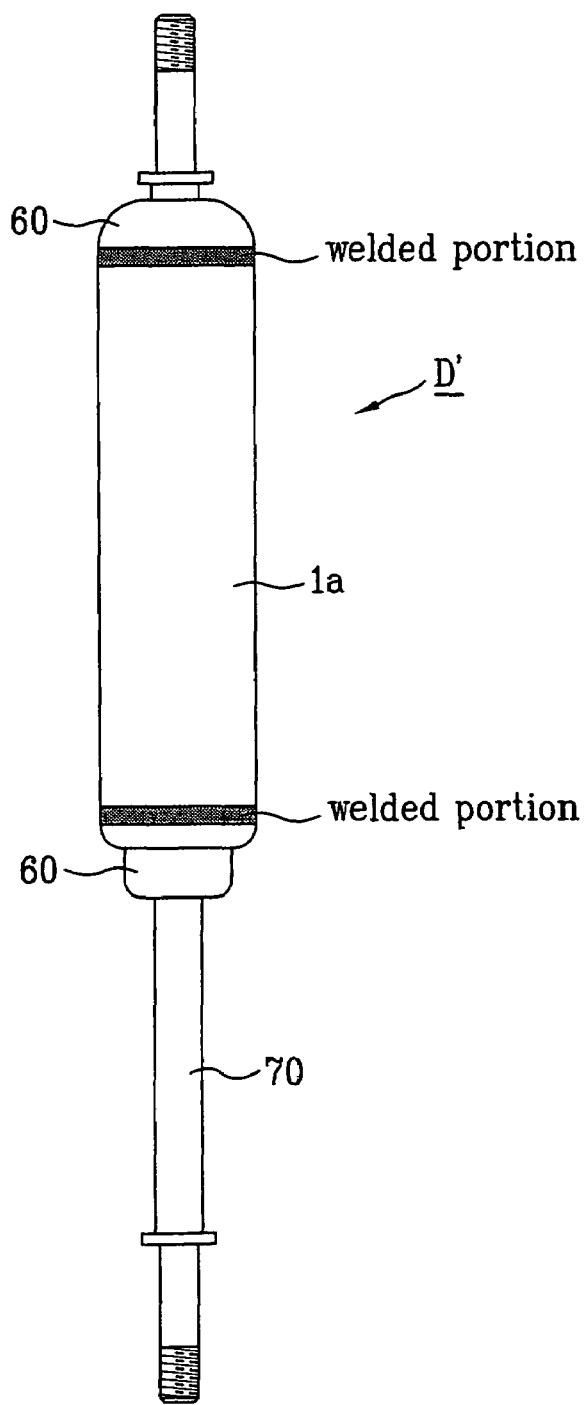
FIG. 2 illustrates an exterior perspective view of a related art oil damper.
Figure 3:
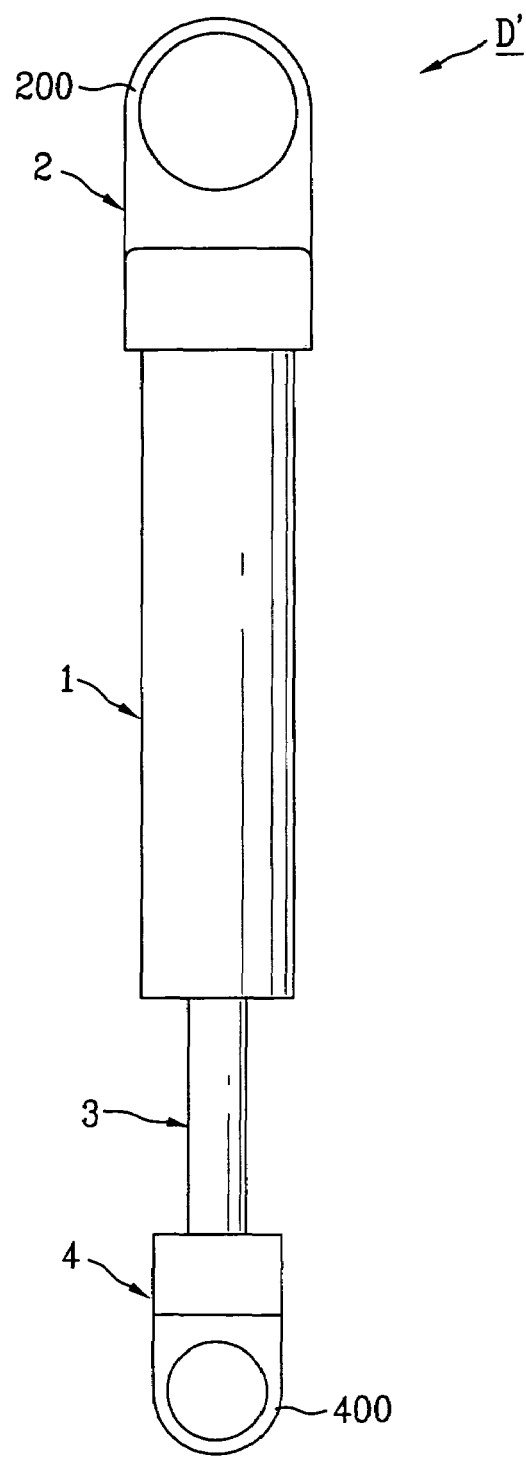
FIG. 3 illustrates a perspective view of an oil damper in accordance with a preferred embodiment of the present invention.
Figure 4:
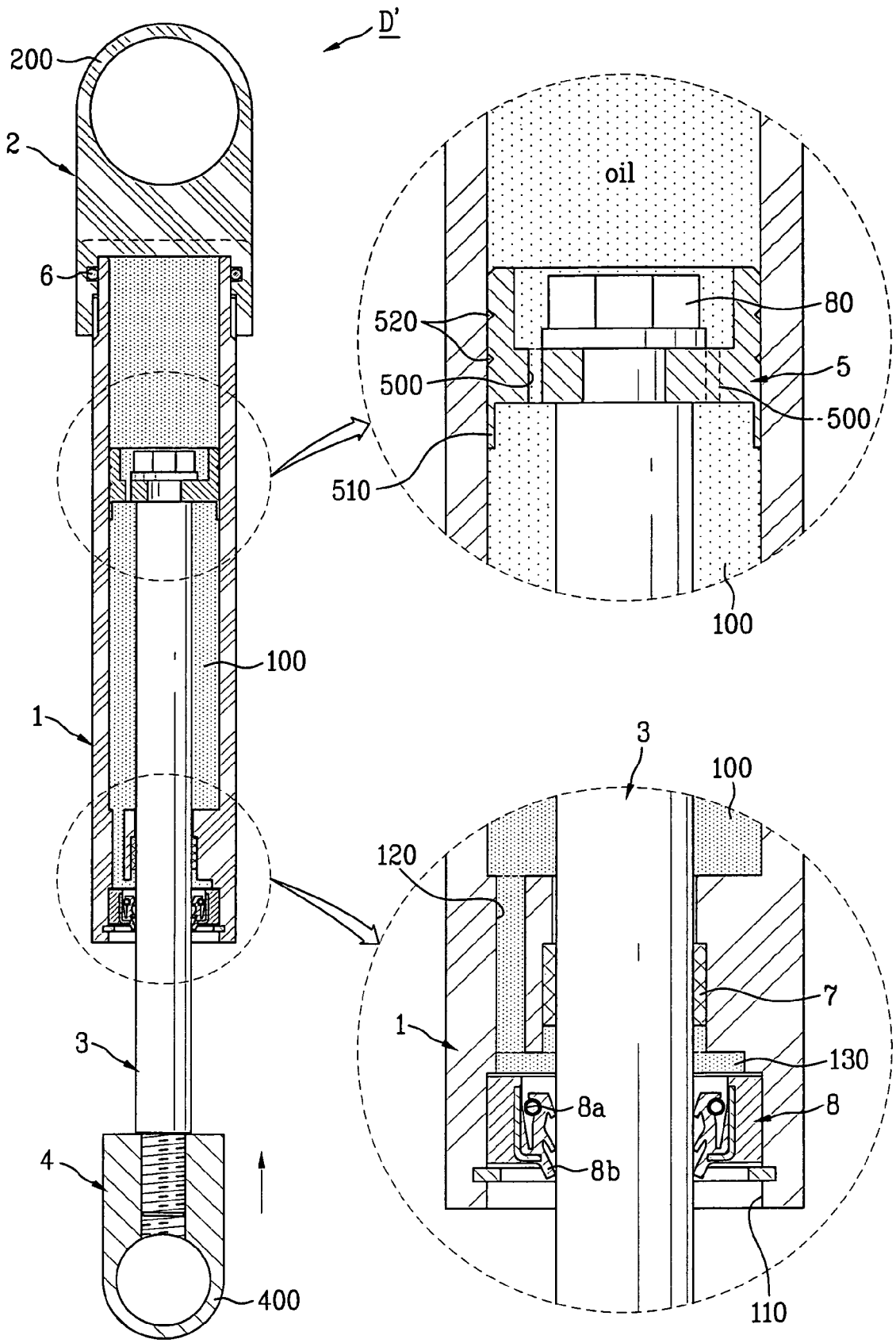
FIG. 4 illustrates a section of FIG. 3 showing the piston moving upward.
Figure 5:
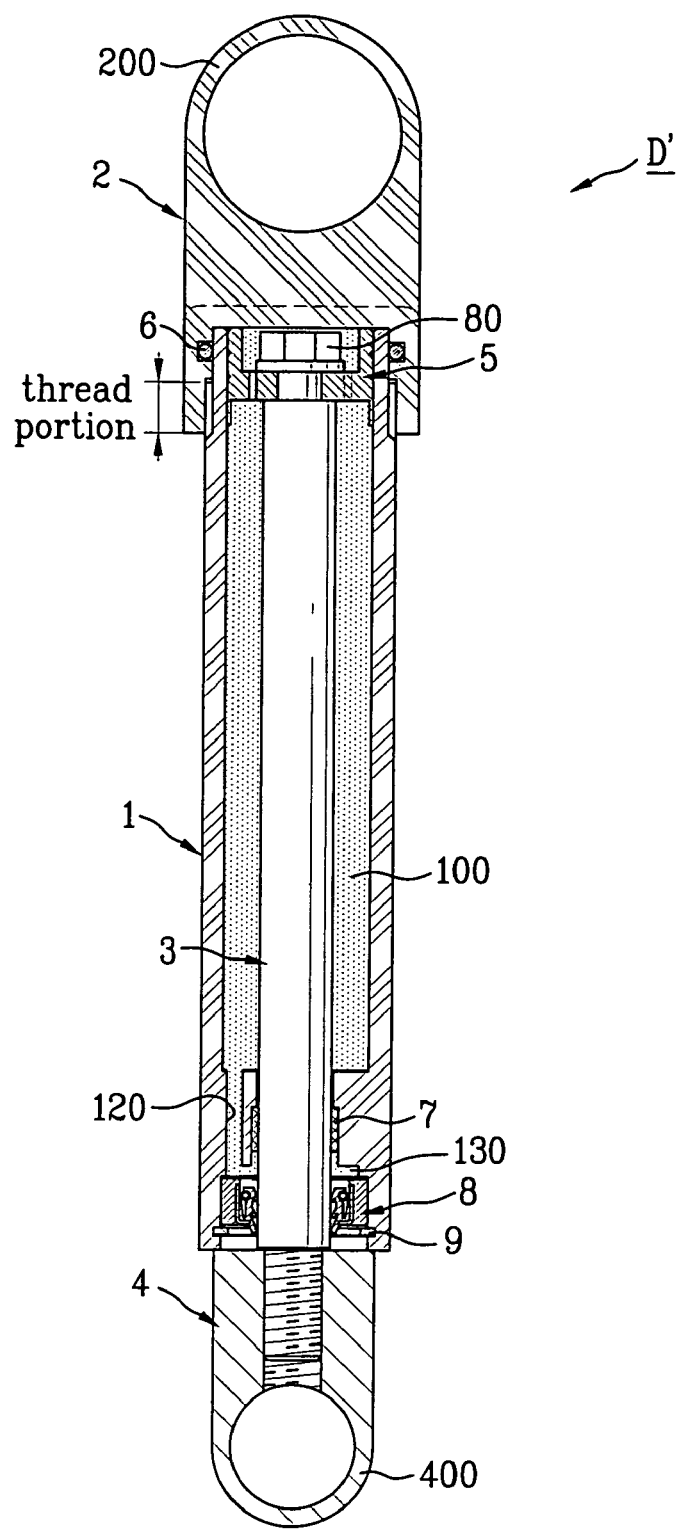
FIG. 5 illustrates a section of FIG. 3 showing the piston positioned at a top dead center.

FIG. 3 illustrates a perspective view of an oil damper in accordance with a preferred embodiment of the present invention, and FIGS. 4 and 5 illustrate sections of the FIG. 3, wherein FIG. 4 illustrates a section of FIG. 3 showing the piston moving upward, and FIG. 5 illustrates a section of FIG. 3 showing the piston positioned at a top dead center.

Referring to the drawings, the oil damper D in accordance with a first preferred embodiment of the present invention includes a hollow cylinder 1 having an oil chamber 100 for filling oil therein, a tub holder 2 fixedly secured to one end of the cylinder 1 for securing the damper to a tub 20 side, a shaft 3 passed through, and exposed from the other end of the cylinder 1, a base holder 4 fixedly secured to the shaft 3 at an end thereof exposed to an outside of the cylinder 1 for securing the damper to a base side of the cabinet 10, and a piston 5 having a plurality of oil holes 500, for sliding inside of the cylinder 1, wherein at least one of above components is formed by plastic injection molding.

That is, at least one of the cylinder 1, the tub holder 2, the base holder 4, the piston 5, and the shaft 3 is formed by plastic injection molding.

There is an O-ring 6 between one end of the cylinder 1 and the tub holder 2, for preventing the oil from leaking from an inside of the cylinder 1.

In more detail, the O-ring 6 in a groove in a region spaced away from a threaded portion of the inside circumferential surface of the tub holder 2 is compressed on an outside circumferential surface of one end of the cylinder 1 when the tub holder 2 is fastened to the one end of the cylinder 1.

In the meantime, there are threaded portions on at an outside circumferential surface of one end of the cylinder 1, and at an inside circumferential surface of the tub holder 2 respectively, for fastening the one end of the cylinder 1 to the tub holder 2.

There are also threaded portions at an end of the shaft 3 exposed to an outside of the cylinder 1, and the base holder 4, for fastening the shaft 3 and the base holder 4 together.

In the meantime, the tub holder 2 and the base holder 4 have annular rings 200 for securing to the tub 20 and the base side of the cabinet 10.

The shaft 3 may be formed of a high strength plastic, such as an engineering plastic or fiber reinforced plastic.

The piston 5 is fastened to the shaft 3 with a bolt 80 in a state a washer is placed between the piston 5 and the shaft 3, wherein, referring to FIG. 5, the piston 5 includes a thin skirt portion 510 at the circumference thereof on a side of the base holder which maintains a state in which an outside diameter of the skirt portion 510 is greater than an inside diameter of the cylinder 1 in a natural state when no outside pressure is applied thereto.

That is, the skirt portion 510 is in close contact with the inside circumferential surface of the cylinder in a state the piston 5 is inside the cylinder.

The piston has at least one groove 520 in an outside circumference of the piston 5 in a circumferential direction.

In the meantime, of components of damper of the present invention, it is preferable that the piston 5 and the cylinder 1 are formed of a thermoplastic resin having a fluorine resin mixed therewith for improving an abrasion resistance, particularly, a resin with a self-lubricating property, such as Teflon, because the piston 5 slides the inside circumferential surface of the cylinder 1.

The components, i.e., the cylinder 1 and the piston 5, the tub holder 2 and the base holder 4, and so on may be formed of a thermoplastic material with good heat, and chemical resistances, such as POM (Polyoxymethylene), PC (Polycarbonate), PBT (Polybutylene Terephthalate), of polyacetal.

Moreover, though it is preferable that the piston 5 has a plurality of oil holes 500 around a center portion of a surface of the piston 5, the position of formation of the oil holes 500 are not limited to this.

Mounted inside of the other end of the cylinder 1 in succession, there are an oil seal 8 for preventing oil from leaking, and a bushing 7 for supporting the piston 5, to guide a linear motion of the piston 5.

In more detail, at the other end of the cylinder 1, there is a stepped opening 110 having different diameters in an axial direction of the cylinder 1, having the metal bushing 7 press fit and secured to a small diametered portion at the most inner portion of the stepped opening 110, and the oil seal 8 press fit and secured to a large diametered portion at an outer side of the stepped opening 110.

The bushing 7 and the oil seal 8 are spaced a predetermined distance away in the axial direction, and the cylinder 1 has a communication hole 120 for making the oil chamber 100 and a space 130 between the bushing 7 and the oil seal 8 in communication. At least one communication hole 120 is formed in the inside wall of the cylinder 1 in a circumferential direction thereof as one body therewith.

The busing 7 is formed of copper or iron, and has Teflon coated on a surface including at least an inside circumferential surface of the bushing 7, for improving an abrasion resistance.

The bushing 7 may be sintered, and oil impregnated.

The oil seal 8 has a ring shape on the whole, and a spring 8a for pressing the oil seal 8 to an outside circumferential surface of the shaft 3 in a direction the oil seal 8 is in close contact with the outside circumferential surface of the shaft 3, and the oil seal 8 has a plurality of lips 8b in contact with the outside circumferential surface of the shaft 3.

Though not shown, the oil seal 8 has projections from an outside circumferential surface thereof for making close contact with an inside circumferential surface of the large diametered portion of the stepped opening 110 when the oil seal 8 is press fit into the large diametered portion. That is, though the projections are not shown in FIGS. 4 and 5 as the projections are elastically deformed, the projections are restored, so to be visible if the oil seal 8 is drawn from the stepped opening 110.

In the meantime, there is a stopper 9 on an outer side of the oil seal 8 of the cylinder 1 for preventing the oil seal 8 from falling off the cylinder 1.

As the stopper 9, a C-ring having a restoring force is mounted.

The cylinder 1 the cylinder 1 has a diameter on a side of the base holder 4 smaller than a diameter on a side of the tub holder 2 taking a withdrawal gradient into account.

The operation and principle of the oil damper D of the present invention will be described.

The oil damper D dampens vibration of the tub 20 on a principle that, when the tub 20 vibrates during washing or spinning, the piston 5 moves under a resistance of oil sealed in the oil chamber 100 of the cylinder 1 until the piston stops owing to viscosity of the oil.

The oil damper is more favorable than the friction damper in view of vibration absorption and a rate of the vibration absorption.

The higher the viscosity of the oil, the longer the rebound, such that the rebound becomes slightly slower, and the impact absorption becomes the better.

The slow rebound is not favorable for successive impacts, and, opposite to this, a low viscosity of the oil makes the rebound faster, but the impact absorption poor.

In the meantime, the components of the oil damper D of the present invention and effects thereof will be described in detail.

Different from the related art oil damper D', as all large components, such as the hollow cylinder 1, the tub holder 2, the piston 5, the shaft 3, the base holder 4, and so on of the oil damper D, are formed of inexpensive plastic, a production cost of the oil damper D is reduced.

Along with this, the viability of mass production of the components of the oil damper D by means of plastic injection molding improves productivity compared to the related art, to drop production costs of the components while improving reliabilities of the components.

The oil damper D of the present invention has an appropriate gap provided between an inside diameter of the cylinder 1 and the piston 5.

The tub holder 2 serves as a securing ring to the tub 20 as well as a cap for preventing oil leaking from the cylinder 1.

That is, the ring 200 of the tub holder 2 enables the oil damper D to be secured to the underside of the tub 20 with a pin, and the ring 400 of the base holder 4 enables the oil damper to be secured to the base of the cabinet 10 with a pin.

Though not shown in detail, a person skilled in this field of art will know easily that, in a state the ring 200 or 400 of the tub holder 2 or the base holder 4 is aligned with a securing portion of the tub 20 or the base of the cabinet 10, the pin (not shown) is passed through to secure the oil damper D to the tub 20 or the base of the cabinet 10.

Next, the tub holder 2 is secured to the cylinder 1 with thread simply, to serve as a cap of the cylinder.

The O-ring 6 between one end of the cylinder 1 and the tub holder 2 is compressed onto a n outside circumference of one end of the cylinder 1 when the tub holder 2 is secured to the one end of the cylinder 1, for positive prevention of the oil from the cylinder 1 to an outside of the cylinder 1.

In more detail, the O-ring 6 in the groove in a region of a circumferential surface of the tub holder 2 spaced away from the threaded portion, is compressed onto the outside circumferential surface of the one end of the cylinder 1 to cut off leakage of the oil in the direction when the tub holder 2 is secured to the one end of the cylinder 1.

As has been described, the oil damper D of the present invention has a structure in which the cylinder 1 and the tub holder 2 are joined with threads.

This thread joining makes, not only assembly of the cylinder 1 and the tub holder 2 simple, but also the cylinder 1 and the tub holder 2 separable, to permit easy draining of oil from the damper when the oil damper is discarded, and replacement of components, such as the piston 5.

The threads on an end of the shaft 3 exposed to an outside of the cylinder 1 and the base holder 4 make joining between the shaft 3 and the base holder 4 simple.

In the meantime, it is required that the shaft 3, a component to which heavy loads are applied, such as vibration from the tub 20 for the first time, is formed of a high strength plastic, such as engineering plastic or fiber reinforced plastic, for absorbing the vibration while supporting the load of the tub 20, securely.

The piston 5 is coupled to an end of the shaft 3 with a bolt 80 readily, and the thin skirt portion 510 on a base holder 4 side circumference of the piston 5 having a diameter greater than the inside diameter of the cylinder 1 expands in a direction the skirt portion 510 becomes in close contact with the inside wall of the cylinder 1 by a pressure of the oil when the piston 5 moves toward the base holder 4, to minimize leakage between the piston 5 and the cylinder 1 and prevent drop of damping capability.

Along with this, the circumferential grooves 520 in the outside circumference of the piston 5 enables the piston 5 to move in a state the piston 5 locks oil in the grooves 520, to provide a labyrinth effect, to prevent leakage of the oil through a gap between the piston 5 and the cylinder 1.

The piston 5 and the cylinder 1 of thermoplastic resin mixed with fluorine resin have good abrasion resistance when the piston 5 slides on the inside circumferential surface of the cylinder 1. Particularly, if the piston 5 and the cylinder 1 are formed of a self lubricating type resin, such as Teflon, better abrasion resistance is obtainable.

In the meantime, the cylinder 1, the piston 4, the tub holder 2, the base holder 4, and so on, formed of thermoplastic resin, such as POM, PC, PBT, or polyacetal, and so on, have good heat resistance and chemical resistance.

The plurality oil holes 500 are formed, arranged radially around a center portion surface of the piston 5, and a size and a number of the oil holes 500 are related to a damping capability, design of the oil holes 500 in appropriate size and number is required.

In the meantime, on an inside of the other end of the cylinder 1, the oil seal 8 for preventing leakage of the oil, and the bushing 7 for supporting the piston 5 and guiding a linear motion of the piston 5 are mounted in succession.

For this, the stepped opening 110 having different diameters along the axial direction of the cylinder 1 is formed inside of the other end of the cylinder 1 so that the metal bushing 7 is press fit in, and secured to the innermost small diametered portion thereof and the oil seal 8 is mounted in the outer large diametered portion of the stepped opening 110.

The communication hole 120 between the oil chamber 100 of the cylinder 1 and the axial direction space 130 between the bushing 7 and the oil seal 8 balances a pressure in the space 130 between the bushing 7 and the oil seal 8, and a pressure in the oil chamber 100.

The bushing 7 of copper Cu or iron Fe has a Teflon coating at least on an inside circumferential surface of the bushing 7 to provide a good abrasion resistance.

Different from this, the bushing 7 may be sintered, and impregnated of oil.

The oil seal 8 with a ring shape on the whole has a spring 8a therein for applying a pressure to the oil seal 8 in a direction the oil seal 8 is in close contact with the outside circumferential surface of the shaft 3, and a plurality of lips 8b on an inside circumferential surface of the oil seal 8 for being in close contact with an outside circumferential surface of the shaft 3, thereby preventing oil leakage between the shaft 3 and the oil seal 8 effectively.

In the meantime, though not shown, there are projections on the outside circumferential surface of the oil seal 8 for making close contact with the large diametered portion of the stepped opening 110 when the oil seal 8 is press fit into the large diametered portion. For reference, as described before, the projections are visible when the oil seal 8 is out of the compressed state.

The stopper 9, such as the C-ring, on an outer side of the oil seal 8 of the cylinder 1 prevents the oil seal 8 from falling off the cylinder 1.

Other than mounting of the stopper 9, a diameter of the cylinder 1 itself may be formed smaller for preventing the oil seal 8 from falling off the cylinder 1, which will be described in detail, later.

In the meantime, the diameter of the cylinder 1 smaller on a tub holder 2 side than on a base holder side 4 which makes a gap between the piston 5 and the cylinder 1 smaller on the tub holder side compensates for a reduced damping capability at the time of movement of the piston 5 toward the tub holder 2 side.

This is intended to take the withdrawal gradient at the time of formation of the cylinder 1 as well as solving the problem of the reduction of damping capability of the oil damper D when the piston 5 moves into account.

Another embodiment of the present invention will be described.

Because geometric shapes of components of the oil damper D are the same with the foregoing embodiment, the same drawing, i.e., FIGS. 3 to 5 are referred as they are.

The oil damper D in accordance with another preferred embodiment of the present invention includes a hollow cylinder 1 having an oil chamber 100 for filling oil therein, a tub holder 2 fixedly secured to one end of the cylinder 1 for securing the damper to a tub 20 side, a metal shaft 3 passed through, and exposed from the other end of the cylinder 1, a base holder 4 fixedly secured to the shaft 3 at an end thereof exposed to an outside of the cylinder 1 for securing the damper to a base side of the cabinet 10, and a piston 5 having a plurality of oil holes 500, for sliding inside of the cylinder 1, wherein at least one of above components except the shaft 3 is formed by plastic injection molding.

Different from the foregoing embodiment, because, of the various components of the oil damper, the shaft 3 is particularly required to have a high strength for taking a load directly, this case shows that only the shaft 3 may be formed of metal which has been widely used in the related art.

That is, different from the foregoing embodiment, in order to secure a higher reliability of the shaft 3, the shaft 3 is fabricated of metal, having a high surface hardness, such as carbon steel, when the shaft 3 is subjected to a surface treatment, such as salt bath nitriding under a high temperature environment higher than 500° C., for preventing formation of rust on a surface of the shaft 3.

In the meantime, the shaft 3 and the base holder 4 may be insert molded after components that holds the piston 5 within the cylinder 1 are assembled.

Or, alternatively, different from this, the shaft 3 and the base holder 4 may be fusion welded by using an ultrasonic wave or the like in a form it is difficult to pull out in one direction. That is, in a state a portion of the shaft 3 to be joined with the base holder 4 is formed to have a diameter greater than other portion, the shaft 3 and the base holder 4 may be fusion welded, to make joining between the shaft 3 and the base holder 4 much stronger, to prevent separation of the base holder 4 from the shaft 3, effectively.

In the meantime, the first embodiment is a case when the shaft 3 and the base holder 4 are joined with threads even if both the shaft 3 and the base holder 4 are formed of plastic, if both the shaft 3 and the base holder 4 are formed of plastic, of course, the shaft 3 and the base holder 4 may be molded as one body.

Moreover, if both the cylinder 1 and the tub holder 2 are formed of plastic, the cylinder 1 and the tub holder 2 may also be formed as one body.

In the meantime, while both of the base holder 4 and the tub holder 2 are formed of plastic, threads may be formed at end ring portions of the tub holder 2 and the base holder 4 for securing the oil damper D to the tub 20 or the base side of the cabinet 10 by means of thread fastening. That is, in this case, by turning the damper having the tub holder 2 secured thereto, or the base holder 4, the oil damper can be secured to a fastening portion of the tub 20 or the base side by thread fastening.

This formation of two components as one body enables to reduce an assembly time of the components in assembly in a final production line.

Different from above embodiment, hexagonal portions may be formed at an end portion of the cylinder 1 to be joined with the tub holder 2, and at the tub holder 2 side for making the thread fastening, more positively.

Though it seems that the tub holder 2 and the base holder 4 respectively have fastening positions fixed with respect to the tub 20 and the base of the cabinet 10 as the components are given the names of tub holder 2 and the base holder 4 respectively, the names are given only for convenience of identification, the fastening positions of the tub holder 2 and the base holder 4 may be altered. That is, the oil damper D of the present invention has no specific mounting direction.

In the meantime, instead of the C-ring as the stopper 9 for preventing the oil seal 8 from falling off the cylinder 1, an end portion of the cylinder 1 of plastic may be melted at the base holder side, and a diameter of the end portion of the cylinder is reduced to be below a diameter of the oil seal 8, for preventing the oil seal from falling off the cylinder 1 by reducing the diameter of the cylinder 1 itself.

That is, in a state if the diameter is reduced in a state the stopper 9 is inserted, the end portion of the cylinder 1 having the diameter reduced thus interference the falling off of the oil seal 8.

In the meantime, of course, the foregoing oil damper D of the present invention is not necessarily applicable limited only to the drum type washing machine. That is, of course, the oil damper D of the present invention is applicable to other home appliances, or industrial apparatuses that require damping and absorption of vibration.

INDUSTRIAL APPLICABILITY

As has been described, the present invention suggests improving a structure of an oil damper.

According to this, materials of major components of the oil damper are changed to plastic, to reduce a production cost of the oil damper, significantly.

Along with this, the oil damper of the present invention enables mass production to improve productivity, and to provide highly reliable oil dampers by improvement of reliability of the components, that in turn enhances reliability of the drum type washing machine having the oil damper applied thereto, thus having very high industrial applicability.

The invention claimed is:

1. An oil damper for a drum type washing machine comprising:
    a hollow cylinder having an oil chamber for filling oil therein;
    a tub holder fixedly secured to one end of the cylinder for securing the damper to a tub side;
    a shaft passed through, and exposed from the other end of the cylinder;
    a base holder fixedly secured to the shaft at an end thereof exposed to an outside of the cylinder for securing the damper to a base side of a cabinet; and
    a piston having a plurality of oil holes, for sliding inside of the cylinder;
    wherein at least one of above components is formed by plastic injection molding; and
    the cylinder includes an oil seal for preventing oil from leaking and a bushing for supporting the piston to guide a linear motion of the piston, mounted in succession on an inside of the other end of the piston, and
    the other end of the piston has a stepped opening having diameters different from each other in an axial direction of the cylinder, wherein the metal bushing is press fit, and secured to a small diametered portion at the innermost side of the stepped opening, and the oil seal is mounted inside of a large diametered portion at an outer side of the stepped opening.

2. The oil damper as claimed in claim 1, further comprising an O-ring between one end of the cylinder and the tub holder for preventing the oil from leaking from the inside of the cylinder.

3. The oil damper as claimed in claim 2, wherein the O-ring is mounted in a groove in a region spaced away from a thread portion on an inside circumferential surface of the tub holder for being compressed onto an outside circumferential surface of the cylinder when the tub holder is fastened to one end of the cylinder.

4. The oil damper as claimed in claim 1, wherein the outside circumferential surface of the one end of the cylinder and the inside circumferential surface of the tub holder have threads formed thereon respectively for joining with each other by thread fastening.

5. The oil damper as claimed in claim 1, wherein the end of the shaft exposed to an outside of the cylinder is fastened to the base holder with threads.

6. The oil damper as claimed in claim 1, wherein the piston is fastened to the shaft with a bolt.

7. The oil damper as claimed in claim 1, wherein the piston includes a thin skirt portion on a circumference of the piston at a base holder side.

8. The oil damper as claimed in claim 1, wherein the piston further includes at least one groove in an outside circumferential surface in a circumferential direction.

9. The oil damper as claimed in claim 1, wherein the cylinder and/or the piston are formed of a self lubricating resin.

10. The oil damper as claimed in claim 1, wherein the cylinder and the piston, and the tub holder and the base holder are formed of thermoplastic resin.

11. The oil damper as claimed in claim 1, wherein the shaft is formed of engineering plastic or fiber reinforced plastic.

12. The oil damper as claimed in claim 1, wherein the bushing and the oil seal are spaced a predetermined distance away from each other in an axial direction, and the cylinder has a communication hole for making the oil chamber and the space between the bushing and the oil seal in communication.

13. The oil damper as claimed in claim 1, wherein the bushing is formed of copper or iron.

14. The oil damper as claimed in claim 1, wherein the bushing is sintered and oil impregnated.

15. The oil damper as claimed in claim 1, wherein the oil seal includes a spring therein for applying a pressure in a direction the oil seal is in close contact with an outside circumferential surface of the shaft.

16. The oil damper as claimed in claim 1, wherein the oil seal further includes at least one lip on an inside circumferential surface of the oil seal for making close contact with an outside circumferential surface of the shaft.

17. The oil damper as claimed in claim 1, wherein the cylinder further includes a stopper on an outer side of the oil seal for preventing the oil seal from falling off the cylinder.

18. The oil damper as claimed in claim 17, wherein the stopper is a C-ring.

19. The oil damper as claimed in claim 1, wherein the cylinder has a diameter greater on a base holder side than on a tub holder side to make a gap between the piston and the cylinder smaller on the base tub holder side for compensating for a reduced damping capability of the base holder side.

20. The oil damper as claimed in claim 1, wherein the shaft and the base holder are formed as one body.

21. The oil damper as claimed in claim 1, wherein the cylinder and the tub holder are formed as one body.

22. The oil damper as claimed in claim 1, wherein the shaft is formed of carbon steel.

23. The oil damper as claimed in claim 22, wherein the shaft is a salt bath nitriding processed under a high temperature environment higher than 500° C. for preventing a surface thereof from rusting.

24. The oil damper as claimed in claim 22, wherein the shaft and the base holder are fusion welded by using an ultrasonic wave or the like.

25. The oil damper as claimed in claim 22, wherein the shaft and the base holder are joined by fusion welding in a state a portion of the shaft to be joined with the base holder is formed to have a diameter greater than other portion.

26. The oil damper as claimed in claim 1, wherein the cylinder further includes an end portion of the base holder side melted to reduce a diameter thereof below a diameter of the oil seal, for preventing the oil seal from falling off the cylinder through the reduction of diameter of the cylinder itself.

27. An oil damper for a drum type washing machine comprising:
    a hollow cylinder of a plastic injection molding having an oil chamber for filling oil therein;

a tub holder of a plastic injection molding fixedly secured to one end of the cylinder for securing the damper to a tub side;

a metal shaft passed through, and exposed from the other end of the cylinder;

a base holder of a plastic injection molding fixedly secured to the shaft at an end thereof exposed to an outside of the cylinder for securing the damper to a base side of a cabinet; and a piston of a plastic injection molding joined with one end of the shaft having a plurality of oil holes, for sliding inside of the cylinder;

an O-ring mounted between the one end of the cylinder and the tub holder for preventing oil from leaking from an inside of the cylinder;

an oil seal mounted on an inside of the other end of the cylinder for preventing oil from leaking; and a bushing on an inner side of the cylinder for supporting the piston and guiding a linear motion of the piston;

wherein the other end of the piston has a stepped opening having diameters different from each other in an axial direction of the cylinder, wherein the metal bushing is press fit, and secured to a small diametered portion at the innermost side of the stepped opening, and the oil seal is mounted inside of a large diametered portion at an outer side of the stepped opening.

* * * * *